(12) United States Patent
Goto et al.

(10) Patent No.: US 10,496,361 B2
(45) Date of Patent: Dec. 3, 2019

(54) AUDIO DEVICE

(71) Applicant: Toyota Jidosha Kabushiki Kaisha, Toyota-shi Aichi-ken (JP)

(72) Inventors: Takashi Goto, Okazaki (JP); Hiroshi Nishimura, Anjo (JP)

(73) Assignee: Toyota Jidosha Kabushiki Kaisha, Toyota-shi Aichi-ken (JP)

( * ) Notice: Subject to any disclaimer, the term of this patent is extended or adjusted under 35 U.S.C. 154(b) by 0 days.

(21) Appl. No.: 16/232,381

(22) Filed: Dec. 26, 2018

(65) Prior Publication Data

US 2019/0212970 A1    Jul. 11, 2019

(30) Foreign Application Priority Data

Jan. 9, 2018 (JP) ................................ 2018-001325

(51) Int. Cl.
| | |
|---|---|
| *G06F 17/00* | (2019.01) |
| *G06F 3/16* | (2006.01) |
| *G10L 25/60* | (2013.01) |

(52) U.S. Cl.
CPC .............. *G06F 3/165* (2013.01); *G10L 25/60* (2013.01)

(58) Field of Classification Search
CPC ................... G06F 3/165; G10L 25/60
See application file for complete search history.

(56) References Cited

U.S. PATENT DOCUMENTS

| | | | | |
|---|---|---|---|---|
| 2003/0093790 A1* | 5/2003 | Logan | .................. | G10H 1/0033 725/38 |
| 2003/0163823 A1* | 8/2003 | Logan | .................... | H04H 20/28 725/89 |
| 2004/0042103 A1* | 3/2004 | Mayer | .................. | G11B 15/026 360/7 |
| 2004/0116088 A1* | 6/2004 | Ellis | ......................... | H04B 1/20 455/132 |
| 2005/0159122 A1* | 7/2005 | Mayer | ...................... | H04B 1/20 455/179.1 |
| 2006/0047722 A1* | 3/2006 | Walker | .................... | H04H 40/90 |
| 2012/0210368 A1* | 8/2012 | Mountain | .............. | H04N 5/782 725/58 |

FOREIGN PATENT DOCUMENTS

| | | |
|---|---|---|
| JP | 2014-175831 A | 9/2014 |
| JP | 2017-060002 A | 3/2017 |

* cited by examiner

*Primary Examiner* — Joseph Saunders, Jr.
(74) *Attorney, Agent, or Firm* — Dinsmore & Shohl LLP

(57) ABSTRACT

An audio device includes a first broadcast processor configured to execute reception processing of a first broadcast wave to generate a first reproduction signal, a reproduction unit configured to reproduce audio based on the first reproduction signal, a first storage configured to temporarily store audio data related to the first reproduction signal, a controller configured to acquire a time table of a broadcast related to the first broadcast wave and receive a saving instruction of a musical piece from a user, and a second storage configured to, when the controller receives the saving instruction, cut first musical piece data of a predetermined musical piece depending on a reception time of the saving instruction from the audio data temporarily stored in the first storage based on the time table and store the first musical piece data.

20 Claims, 6 Drawing Sheets

| START TIME | END TIME | CONTENT TAG | MUSICAL PIECE INFORMATION |
|---|---|---|---|
| 10:00:00 | 10:05:47 | MC | – |
| 10:05:48 | 10:09:51 | MUSICAL PIECE | · CATEGORY: POPS<br>· TITLE: Yesterday<br>· ARTIST NAME: The Beatles<br>· ALBUM TITLE: Help! |
| 10:09:52 | 10:14:11 | MC | – |
| 10:14:12 | 10:15:12 | CM | – |
| 10:15:13 | 10:18:23 | MC | – |

AUDIO DEVICE

CROSS-REFERENCE TO RELATED APPLICATIONS

This application claims priority to Japanese Patent Application No. 2018-001325 filed on Jan. 9, 2018, which is incorporated herein by reference in its entirety including the specification, drawings and abstract.

BACKGROUND

1. Technical Field

The present disclosure relates to an audio device.

2. Description of Related Art

In the related art, an audio device that receives a radio broadcast and saves data relating to a musical piece included in a signal of the radio broadcast in a storage to construct a sound library is known.

For example, Japanese Unexamined Patent Application Publication No. 2014-175831 (JP 2014-175831 A) discloses an audio device that, when a music source that is not a radio broadcast is viewed or the like, displays information of a musical piece corresponding to musical piece identification information included in a signal of a digital radio broadcast, and when switching to the radio broadcast is selected, reproduces an audio signal of the musical piece included in a signal of the received radio broadcast.

For example, Japanese Unexamined Patent Application Publication No. 2017-060002 (JP 2017-060002 A) discloses a content reproduction device that, when a musical piece stored in external equipment is being reproduced, determines whether or not a musical piece of a radio broadcast conforms to a prescribed condition based on musical piece identification information included in the radio broadcast, records a musical piece conforming to the condition, and makes the recorded musical piece be reproduced after the reproduction of the musical piece being reproduced ends.

SUMMARY

However, in the configuration of the related art, there is a need to register musical pieces to be saved as a saving target one by one.

Accordingly, the disclosure provides an audio device capable of efficiently saving musical piece data.

An aspect of the disclosure relates to an audio device. The audio device includes a first broadcast processor, a reproduction unit, a first storage, a controller, and a second storage. The first broadcast processor is configured to execute reception processing of a first broadcast wave to generate a first reproduction signal. The reproduction unit is configured to reproduce audio based on the first reproduction signal. The first storage is configured to temporarily store audio data related to the first reproduction signal. The controller is configured to acquire a time table of a broadcast related to the first broadcast wave and receive a saving instruction of a musical piece from a user. The second storage is configured to, when the controller receives the saving instruction, cut first musical piece data of a predetermined musical piece depending on a reception time of the saving instruction from the audio data temporarily stored in the first storage based on the time table and store the first musical piece data.

According to the aspect of the disclosure, it is possible to efficiently save musical piece data having high audio quality.

In the audio device according to the first aspect of the disclosure, the controller may be configured to, when the time table is superimposed on the first broadcast wave, separate the superimposed time table from the first broadcast wave to acquire the time table, and when the time table is not superimposed on the first broadcast wave, acquire the time table through a communication network.

The audio device according to the first aspect of the disclosure may further include a second broadcast processor and a selector. The second broadcast processor may be configured to execute reception processing of a second broadcast wave having the same content as the first broadcast wave to generate a second reproduction signal. The selector may be configured to detect audio quality of each of the first reproduction signal and the second reproduction signal and select a signal having higher audio quality between the first reproduction signal and the second reproduction signal. The reproduction unit may be configured to reproduce audio based on the signal selected by the selector between the first reproduction signal and the second reproduction signal. The first storage may be configured to temporarily store audio data related to the signal selected by the selector between the first reproduction signal and the second reproduction signal.

In the audio device according to the first aspect of the disclosure, the controller may be configured to detect audio quality of the first musical piece data stored in the second storage. The audio device may further include a display unit configured to display audio quality information indicating the audio quality detected by the controller in association with musical piece information indicating a musical piece related to the first musical piece data.

In the audio device according to the aspect of the disclosure, the controller may be configured to receive a complementation instruction of the first musical piece data stored in the second storage, when the complementation instruction is received, acquire second musical piece data corresponding to a musical piece related to the complementation instruction through a communication network, and synthesize the first musical piece data stored in the second storage and the acquired second musical piece data to generate synthesized musical piece data. The second storage may be configured to store the synthesized musical piece data.

In the audio device according to the aspect of the disclosure, the controller may be configured to replace first partial data in the first musical piece data having audio quality lower than the second musical piece data with second partial data in the second musical piece data corresponding to the first partial data to synthesize the first musical piece data and the second musical piece data.

In the audio device according to the aspect of the disclosure, the controller may be configured to, when the complementation instruction is received, acquire moving image data corresponding to the musical piece related to the complementation instruction through the communication network and extract the second musical piece data from the acquired moving image data to acquire the second musical piece data.

According to the aspect of the disclosure, it is possible to provide an audio device capable of efficiently saving musical piece data having high audio quality.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
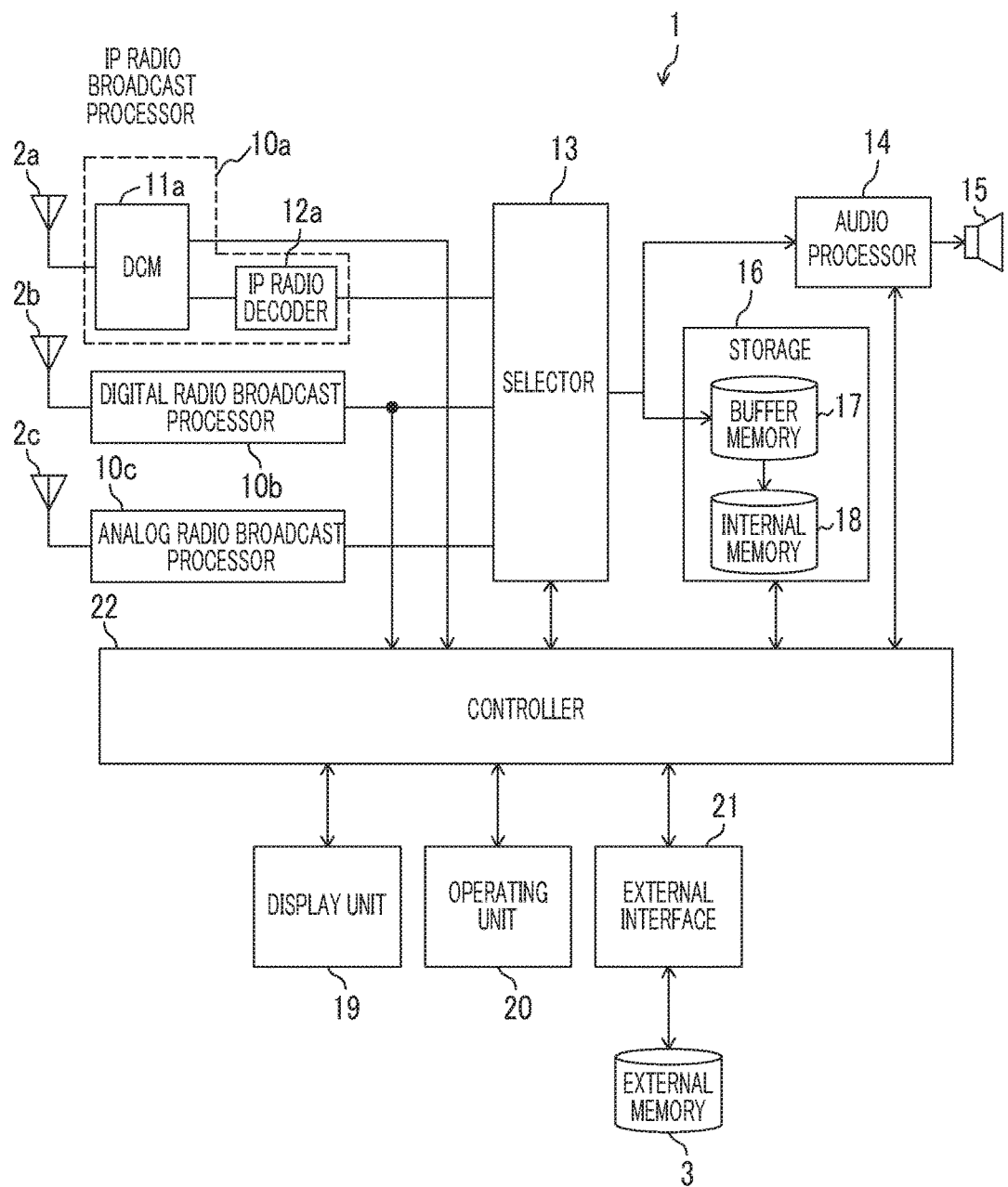
FIG. 1 is a schematic configuration diagram of an audio device.

An embodiment of the disclosure will be described referring to the accompanying drawings (Note that, in the drawings, the same reference numerals represent the same or similar configurations).

(1) Configuration of Audio Device 1

FIG. 1 is a schematic configuration diagram of an audio device 1 according to a first embodiment of the disclosure. The audio device 1 includes antennas 2a, 2b, 2c, an internet protocol (IP) radio broadcast processor 10a, a digital radio broadcast processor 10b, an analog radio broadcast processor 10c, a selector 13, an audio processor 14, a speaker 15, a storage 16, a display unit 19, an operating unit 20, an external interface 21, and a controller 22. The audio processor 14 and the speaker 15 function as a reproduction unit. For example, one of the IP radio broadcast processor 10a, the digital radio broadcast processor 10b, and the analog radio broadcast processor 10c functions as a first broadcast processor, and another broadcast processor functions as a second broadcast processor.

The IP radio broadcast processor 10a receives a signal of an IP radio broadcast through the antenna 2a, executes predetermined processing, generates a reproduction signal related to the IP radio broadcast, and outputs the reproduction signal to the selector 13. The IP radio broadcast processor 10a includes, for example, a data communication module (DCM) 11a and an IP radio decoder 12a. The DCM 11a is a communication device that performs exchange of data with an information center providing various kinds of information related to a radio broadcast through a wireless communication network, such as the Internet. The information center may be, for example, an information processing server that is used by each radio station or a central server that collectively manages information from each radio station. In particular, the DCM 11a receives a signal of an IP radio broadcast from a broadcast station through the wireless communication network, executes predetermined processing, and then, outputs a signal to the IP radio decoder 12a. The IP radio decoder 12a executes decoding processing on the signal output from the DCM 11a and outputs a generated reproduction signal to the selector 13. The DCM 11a separates metadata superimposed on the signal of the IP radio broadcast and outputs the metadata to the controller 22. A time table or the like described below is included in the metadata. Note that the IP radio broadcast processor 10a may execute the above-described processing on each of a plurality of IP radio broadcasts of different channels.

The digital radio broadcast processor 10b receives a signal of a digital radio broadcast through the antenna 2b, executes predetermined processing, generates a reproduction signal related to the digital radio broadcast, and outputs the reproduction signal to the selector 13. The digital radio broadcast processor 10b includes, for example, a wave detection unit and a demodulation unit (not shown), and the like. The wave detection unit receives a signal input from the antenna 2b, executes wave detection processing on the signal to generate a wave detection signal, and outputs the wave detection signal to the demodulation unit. The demodulation unit receives the wave detection signal input from the wave detection unit, executes demodulation processing on the wave detection signal, and outputs a generated reproduction signal to the selector 13. When metadata is included in the signal of the digital radio broadcast, the digital radio broadcast processor 10b separates the metadata and outputs the metadata to the controller 22. Note that the digital radio broadcast processor 10b may execute the above-described processing on each of a plurality of digital radio broadcast waves having different frequencies.

The analog radio broadcast processor 10c receives a signal of an analog radio broadcast through the antenna 2c, executes predetermined processing, generates a reproduction signal related to the analog radio broadcast, and outputs the reproduction signal to the selector 13. The analog radio broadcast processor 10c includes, for example, a wave detection unit and a demodulation unit (not shown), and the like. The wave detection unit receives a signal input from the antenna 2c, executes wave detection processing on the signal to generate a wave detection signal, and outputs the wave detection signal to the demodulation unit. The demodulation unit receives the wave detection signal input from the wave detection unit, executes demodulation processing on the wave detection signal and outputs a generated reproduction signal to the selector 13. Note that the analog radio broadcast processor 10c may execute the above-described processing on each of a plurality of analog radio broadcast waves having different frequencies.

In general, a so-called simultaneous broadcast that provides a radio program having the same content using a plurality of broadcast waves among the IP radio broadcast wave, the digital radio broadcast wave, and the analog radio broadcast wave is performed. In the embodiment, the broadcast waves that perform the broadcast (simultaneous broadcast) having the same content as described above are referred to as a first broadcast wave and a second broadcast wave. Each of the first broadcast wave and the second broadcast wave may be any combination of the IP radio broadcast wave, the digital radio broadcast wave, and the analog radio broadcast wave.

The selector 13 detects audio quality of each of a plurality of reproduction signals related to the simultaneous broadcast and selects one reproduction signal having high audio quality among the reproduction signals. The selector 13 includes, for example, a frame memory, a digital-to-analog converter, a comparator, an audio quality detection circuit, a digital signal processor (DSP) (not shown), and the like. The selector 13 receives the reproduction signal (IP radio reproduction signal) output from the IP radio broadcast processor 10a, the reproduction signal (digital radio reproduction signal) output from the digital radio broadcast processor 10b, and the reproduction signal (analog radio reproduction signal) output from the analog radio broadcast processor 10c. Then, the selector 13 detects audio quality of each of the IP radio reproduction signal, the digital radio reproduction signal, and the analog radio reproduction signal that perform the simultaneous broadcast, for example. Then, the selector 13 outputs one signal having the highest audio quality among the IP radio reproduction signal, the digital radio reproduction signal, and the analog radio reproduction signal to the audio processor 14 and a buffer memory 17 based on the detected audio quality, for example.

The audio processor 14 includes, for example, a digital-to-analog conversion unit and a power amplification unit (not shown). The audio processor 14 generates an audio signal based on the signal input from the selector 13, amplifies the audio signal, and then, outputs the audio signal to the speaker 15. The speaker 15 generates audio based on the audio signal input from the audio processor 14.

The storage 16 is constituted of, for example, a magnetic tape device, a magnetic disk device, an optical disk device, and the like. The storage 16 stores an operating system program, a driver program, an application program, data, and the like that are used for processing in the controller 22. The storage 16 includes the buffer memory 17 that functions as a first storage, and an internal memory 18 that functions as a second storage.

The buffer memory 17 has a predetermined storage capacity, and temporarily stores the reproduction signal output from the selector 13, for example.

The internal memory 18 stores musical piece data cut from the buffer memory 17 according to a command of the controller 22, for example. A group of musical piece data stored in the internal memory 18 constitutes a so-called sound library.

The display unit 19 is constituted of, for example, a liquid crystal display (LCD) of the audio device 1 and displays various screens under the control of the controller 22.

The operating unit 20 is provided, for example, in a front surface of the audio device 1 and is constituted of various buttons, arrow keys, numeric keys, hardware, such as a touch panel disposed on the display unit 19, or software where a software keyboard having the functions of the buttons, the arrow keys, and the numeric keys is virtually displayed on the display unit 19. The operating unit 20 may be constituted of a reception unit that is able to receive an operation signal including an operation content from a remote controller terminal different from the audio device 1.

The external interface 21 is constituted of an interface circuit or the like for connecting the audio device 1 to an external memory 3, a user terminal 4, and the like, for example.

The external memory 3 is another example of the second storage. The external memory 3 is constituted of, for example, a semiconductor memory card, a USB memory device, or the like. The external memory 3 stores musical piece data cut from the buffer memory 17 according to a command of the controller 22. A group of musical piece data stored in the external memory 3 constitutes a so-called sound library.

The controller 22 is constituted of a central processor (CPU) or the like incorporated in the audio device 1. The controller 22 integrally controls the operations of the units of the audio device 1 according to the programs stored in the storage 16. The controller 22 may acquire a reference time from a communication network through the DCM 11a. Alternatively, the controller 22 may acquire the reference time from an internal clock (not shown) in the audio device 1.

(2) Operation of Audio Device 1

Next, the operation of the audio device 1 will be described.

(2-1) Musical Piece Saving Flow

Figure 2:
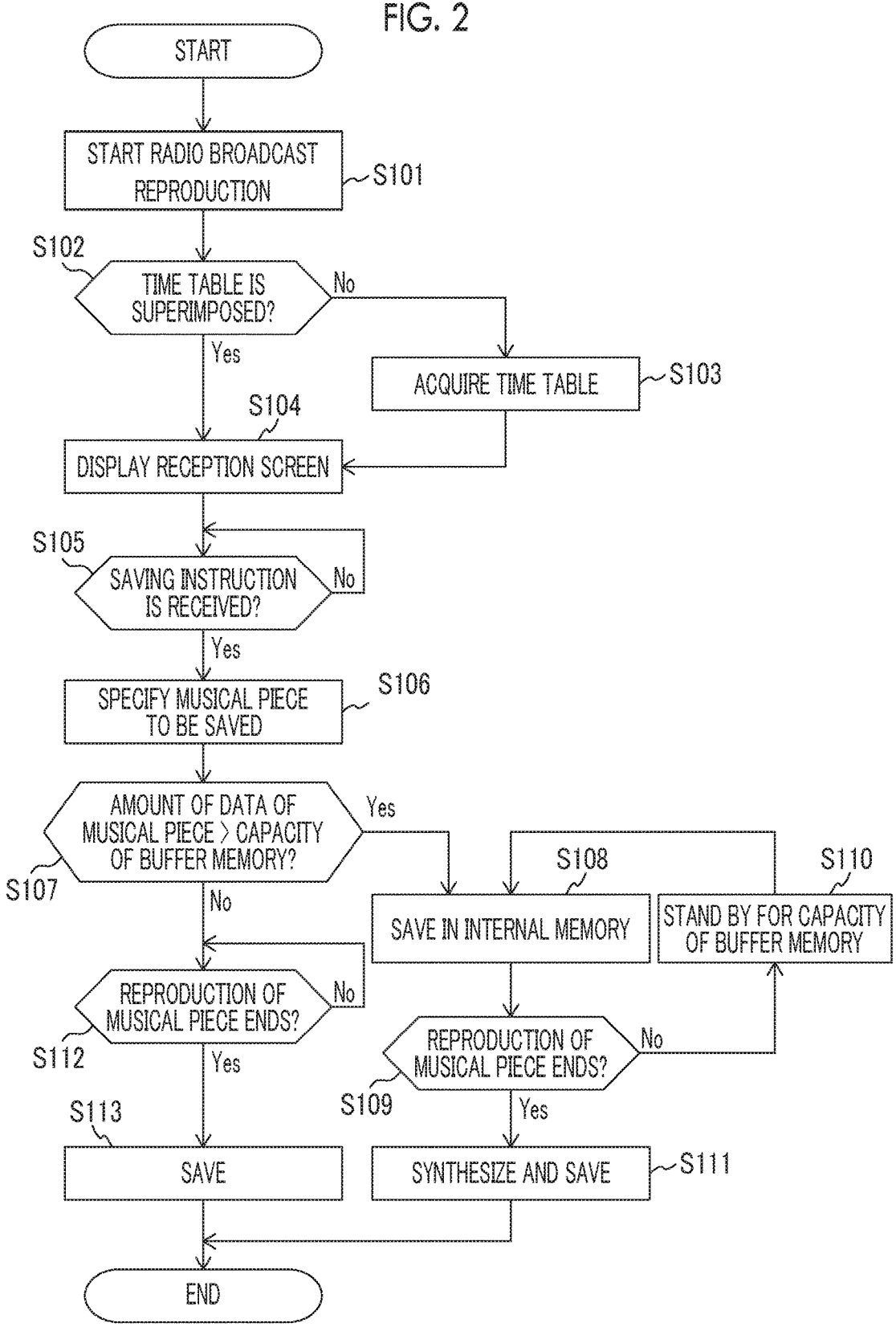
FIG. 2 is a flowchart illustrating a musical piece saving flow in the audio device.

FIG. 2 is a flowchart illustrating a musical piece saving flow in the audio device 1. An operation flow of audio device 1 is executed primarily by the controller 22 in cooperation with the elements of the audio device 1 based on the programs stored in advance in the storage 16.

Step S101

First, the user operates the operating unit 20 to start reproduction of a radio broadcast selected by the user. Specifically, the user selects a classification of the IP radio broadcast, the digital radio broadcast, and the analog radio broadcast, a frequency, and the like. Then, the reproduction signal output from the broadcast processor (the IP radio broadcast processor 10a, the digital radio broadcast processor 10b, or the analog radio broadcast processor 10c) corresponding to the selected radio broadcast is output to the audio processor 14 and the speaker 15 through the selector 13. In this case, the IP radio reproduction signal, the digital radio reproduction signal, and the analog radio reproduction signal related to the simultaneous broadcast may be switched to one another by the selector 13.

Step S102

Next, the controller 22 determines whether or not the time table is superimposed on the radio broadcast wave.

Step S103

When determination is made that the time table is not superimposed on the radio broadcast (Step S102; No), the controller 22 accesses the information center through the DCM 11a to request for the time table, thereby acquiring the time table related to the radio broadcast being reproduced.

Figures 3, 4:
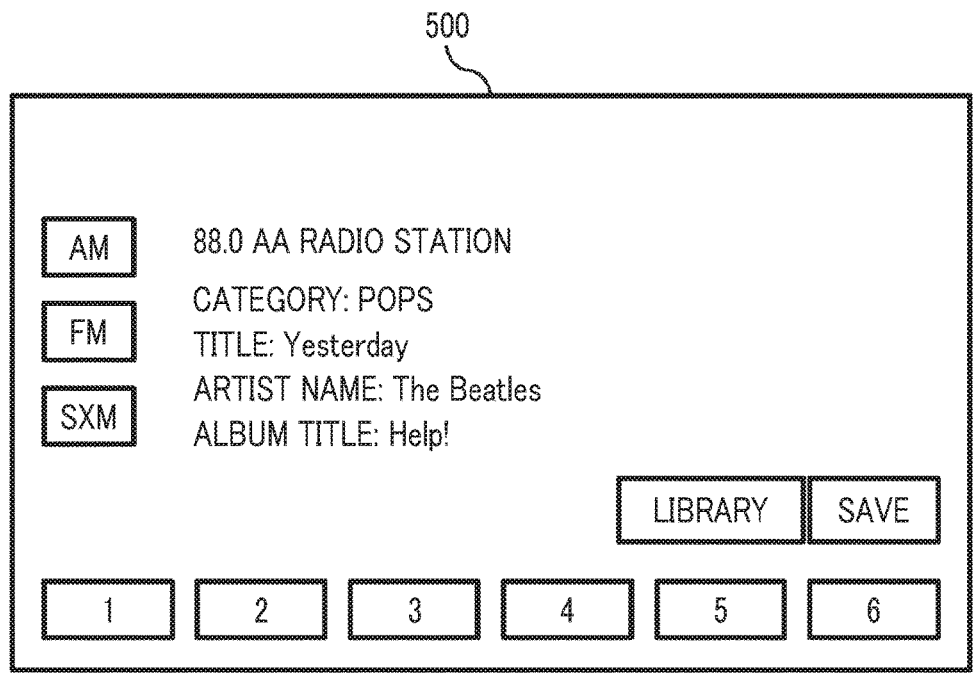
FIG. 3 is a diagram showing an example of a time table.
FIG. 4 is a diagram showing an example of a reception screen.

FIG. 3 is a diagram showing an example of the time table. The time table is a table showing the contents of the broadcast in a time-series order. As shown in FIG. 3, the time table includes, for example, a start time, an end time, a content tag, musical piece information, and the like for each content of a program. The content tag includes, for example, "MC", "musical piece", "CM", and the like. "MC" is the tag indicating a period during which a musical piece is not reproduced in the program. The tag "MC" may be subdivided into, for example, "talk" indicating a period of a talk during which a presenter or a guest is speaking, "segment" indicating a period during which a specific segment is held, and the like. "Musical piece" is a tag indicating a period during which a musical piece is reproduced. "CM" is a tag indicating a period during which a commercial is played. In a period during which the content tag is "musical piece", "musical piece information" is associated. "Musical piece information" includes a category name, a title, an artist name, an album title, and the like of the musical piece.

Step S104

Description will be continued referring to FIG. 2 again. Next, the controller 22 makes the display unit 19 display a reception screen.

FIG. 4 is a diagram showing an example of a reception screen 500. The reception screen 500 is a screen on which various kinds of information related to a radio broadcast being reproduced are displayed. As shown in FIG. 4, the reception screen 500 includes, for example, a classification of a radio broadcast, information of a broadcast station, information relating to a musical piece, and the like. The reception screen 500 includes a library selection part, and when the library selection part is selected, the controller 22 displays a selection screen 600 described below. The reception screen 500 includes a saving instruction part. The controller 22 receives a saving instruction when the user operates the operating unit 20 to select the saving instruction part.

Figure 5:
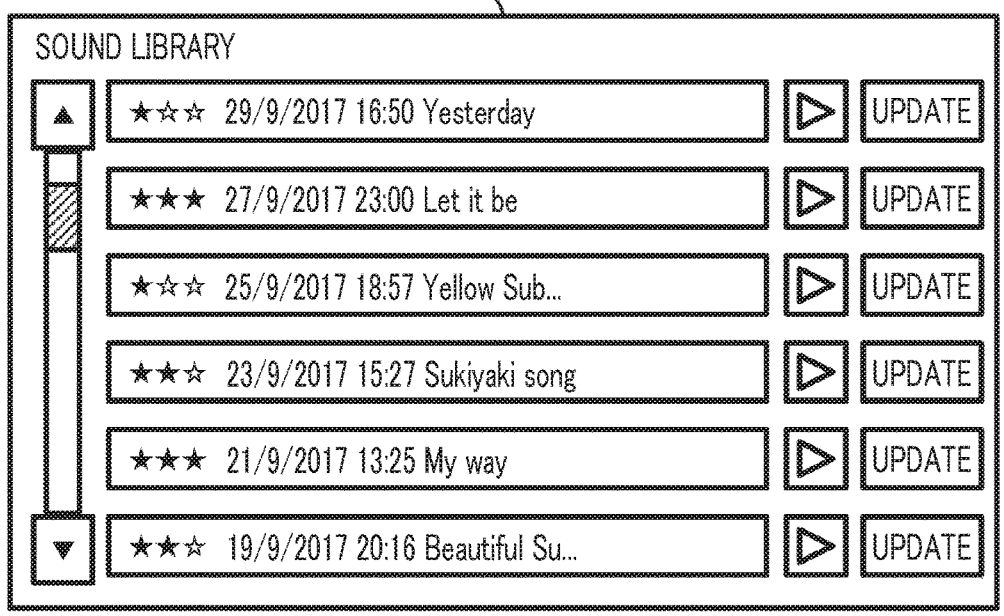
FIG. 5 is a diagram showing an example of a selection screen.

FIG. 5 is a diagram showing an example of the selection screen 600. On the selection screen 600, a list of musical pieces and the like constituting a sound library included in the internal memory 18 or the external memory 3 are displayed. As shown in FIG. 5, the selection screen 600 includes evaluation, a recording time, a musical piece name, a reproduction button, an update button, and the like. When the reproduction button is selected, the controller 22 makes the display unit 19 display a reproduction screen 700 of the selected musical piece, calls musical piece data related to the selected musical piece from the internal memory 18, and reproduces the musical piece through the audio processor 14 and the speaker 15. When the update button is selected, the controller 22 makes the display unit 19 display an edition screen 800 relating to the selected musical piece.

Figure 6:
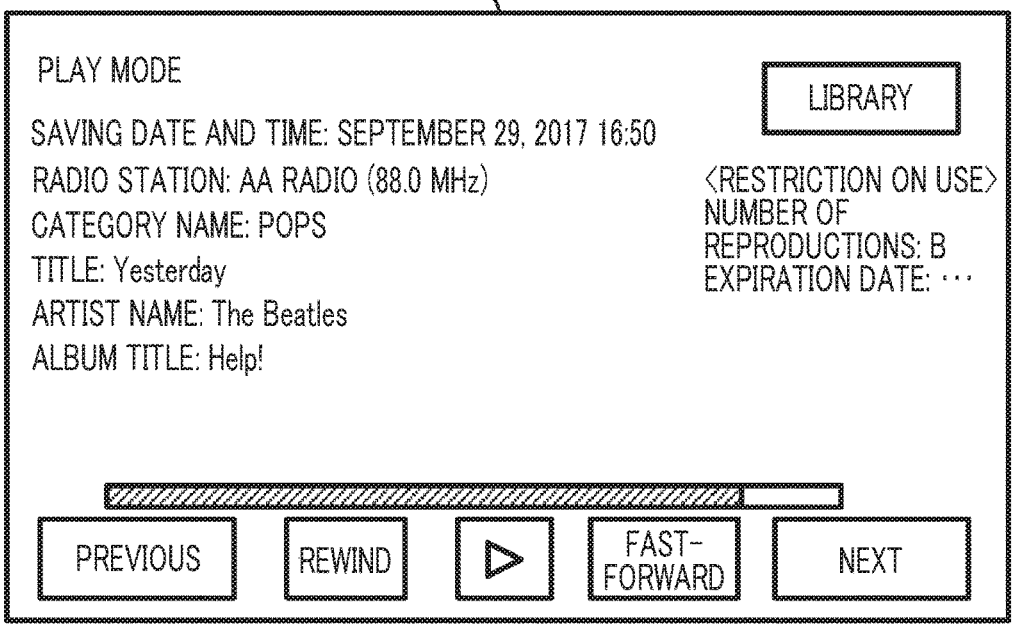
FIG. 6 is a diagram showing an example of a reproduction screen.

FIG. 6 is a diagram showing an example of the reproduction screen 700. On the reproduction screen 700, in regard to a musical piece being reproduced, attribute information of saving date and time of the data, a radio station name, a category name, a musical piece name, an artist name, an album title, and the like are displayed. On the reproduction screen 700, when a restriction on use is imposed on data saved in the internal memory 18 for the musical piece being reproduced, the content of the restriction on use is displayed. The content of the restriction on use is, for example, display of the number of reproductions, an expiration date, and unrestricted. The reproduction screen 700 includes a library button. When selection of the library button is received, the controller 22 makes the display unit 19 display the selection screen 600.

Step S105

Description will be continued referring to FIG. 2 again. Next, the controller 22 determines whether or not the saving instruction is received.

Step S106

When determination is made that the saving instruction part is selected by the user, the controller 22 specifies a musical piece to be saved with reference to the time table. Specifically, the controller 22 specifies a time when a save selection part is selected and specifies a musical piece being reproduced at the time in the time table as the musical piece to be saved. In the time table shown in FIG. 3, when the save selection part is selected in a period of 10:05:48 to 10:09:51, "Yesterday" that is a musical piece being reproduced in the period is specified as the musical piece to be saved.

Step S107

Next, the controller 22 determines whether or not the amount of data of the musical piece to be saved is greater than the capacity of the buffer memory 17.

Step S108

When determination is made that the amount of data of the musical piece to be saved is greater than the capacity of the buffer memory 17 (Step S107; Yes), the controller 22 saves all data stored in the buffer memory 17 in the internal memory 18.

Step S109

Next, the controller 22 determines whether or not reproduction of the musical piece ends.

Step S110

When determination is made that reproduction of the musical piece does not end (Step S109; No), the process returns to Step S108 after standby for the capacity of the buffer memory 17.

Step S111

In Step S109, when determination is made that reproduction of the musical piece ends (Step S109; Yes), data of the musical piece to be saved is cut from data saved in the internal memory 18 in Step S108, data is synthesized by joining data of the musical piece to be saved, and data is saved in the sound library of the internal memory 18.

Step S112

When determination is made in Step S107 that the amount of data of the musical piece to be saved is not greater than the capacity of the buffer memory 17 (Step S107; No), the controller 22 determines whether or not reproduction of the musical piece ends. Then, the controller 22 is on standby until reproduction of the musical piece ends.

Step S113

When determination is made that reproduction of the musical piece ends (Step S112; Yes), the controller 22 cuts data of the musical piece to be saved from data saved in the buffer memory 17 and saves the data in the sound library of the internal memory 18. With the above, the musical piece saving flow ends.

(2-2) Musical Piece Complementation Flow

Figure 7:
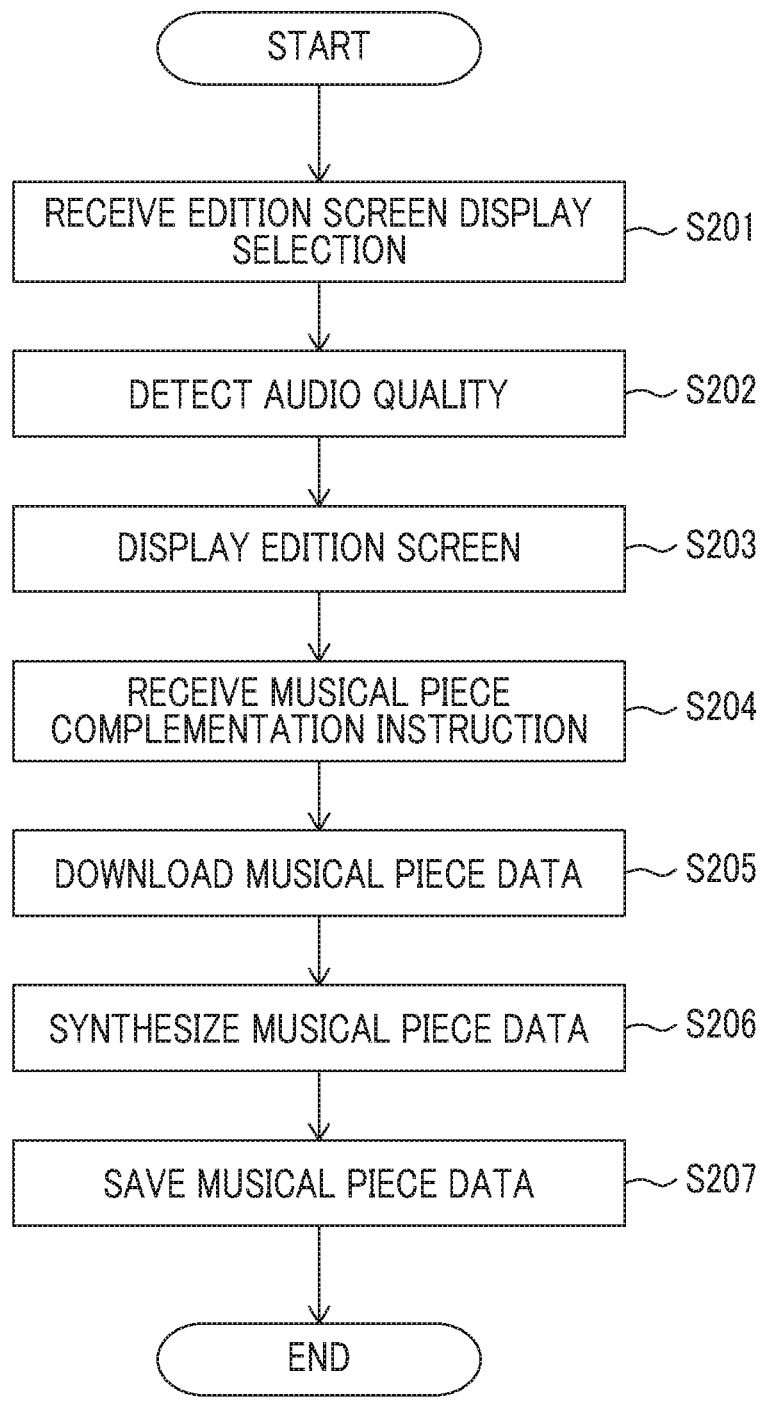
FIG. 7 is a flowchart illustrating a musical piece complementation flow in the audio device.

FIG. 7 is a flowchart illustrating a musical piece complementation flow in the audio device 1. An operation flow of the audio device 1 is primarily executed by the controller 22 in cooperation with the elements of the audio device 1 based on the programs stored in advance in the storage 16.

Step S201

First, the controller 22 receives selection of display of an edition screen 800 according to a user's operation on the operating unit 20.

Step S202

Next, the controller 22 detects audio quality of each piece of musical piece data saved in the internal memory 18. Note that detection processing of audio quality related to the step may be executed in advance.

Step S203

Next, the controller 22 makes the display unit 19 display the edition screen 800.

Figure 8:
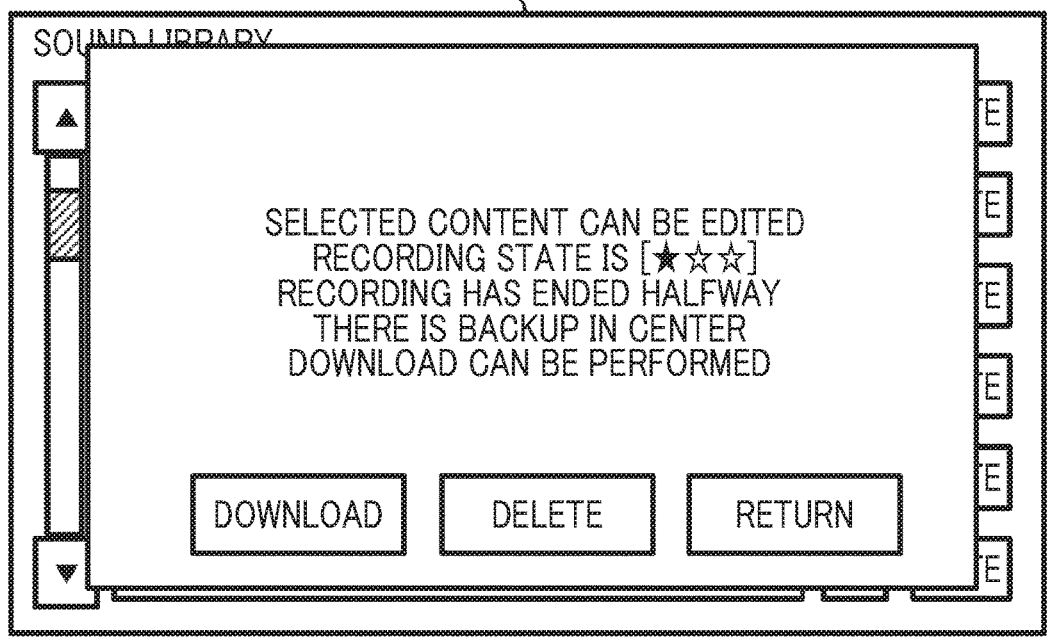
FIG. 8 is a diagram showing an example of an edition screen.

FIG. 8 is a diagram showing an example of the edition screen 800. On the edition screen 800, information (recording state) indicating audio quality, information indicating whether or not data ends halfway, and the like for the selected musical piece are displayed. Furthermore, on the edition screen 800, a download selection part, a delete selection part, a return selection part, and the like are displayed. The download selection part is a selection part for instructing musical piece complementation processing for complementing audio quality of musical piece data.

Step S204

Description will be continued referring to FIG. 7 again. Next, when the user operates the operating unit 20 to select the download selection part, the controller 22 receives the selection as a musical piece complementation instruction.

Step S205

Next, the controller 22 downloads musical piece data corresponding to a musical piece related to the musical piece complementation instruction from the information center, another management server, or the like through the communication network. Note that the controller 22 may download moving image data corresponding to the musical piece related to the musical piece complementation instruction from the information center, another management server, or the like through the communication network and may extract desired musical piece data from the downloaded moving image data.

Step S206

Next, the controller 22 synthesizes musical piece data (first musical piece data) saved in the internal memory 18 and musical piece data (second musical piece data) downloaded in Step S205. For example, the controller 22 replaces partial data (first partial data) in first musical piece data having audio quality lower than second musical piece data with partial data (second partial data) in the second musical piece data corresponding to first partial data.

Step S207

Next, the controller 22 saves musical piece data synthesized in Step S206 in the internal memory 18. With the above, the musical piece saving flow ends.

In the embodiment, the audio device 1 executes reception processing of a first broadcast wave to generate first reproduction signal, reproduces audio based on the first reproduction signal, and temporarily stores audio data related to the first reproduction signal. Then, the audio device 1 acquires a time table of a broadcast related to the first broadcast wave, receives a saving instruction of a musical piece from a user, cuts musical piece data of a musical piece depending on a reception time of the saving instruction from temporarily stored audio data based on the time table and stores the musical piece data. With the configuration, it is possible to efficiently save musical piece data.

The embodiments described above are intended to facilitate understanding of the disclosure, and are not intended to interpret the disclosure in a limited way. Each of elements in the embodiments, and the arrangement, materials, conditions, shapes, sizes, and the like of the elements are not limited to those exemplified and can be appropriately changed. The configurations described in the different embodiments can be partially substituted or combined.

What is claimed is:

1. An audio device comprising:
a first broadcast processor configured to execute reception processing of a first broadcast wave to generate a first reproduction signal;
a reproduction unit that includes an audio processor and a speaker, the reproduction unit configured to reproduce audio based on the first reproduction signal;
a first storage configured to temporarily store audio data related to the first reproduction signal;
a controller configured to acquire a time table of a broadcast related to the first broadcast wave and receive a saving instruction of a musical piece from a user;
a display unit; and
a second storage configured to, when the controller receives the saving instruction, cut first musical piece data of a predetermined musical piece depending on a reception time of the saving instruction from the audio data temporarily stored in the first storage based on the time table and store the first musical piece data,
wherein the controller is configured to:
detect audio quality of the first musical piece data stored in the second storage,
control the display unit to display audio quality information indicating the audio quality detected by the controller in association with musical piece information indicating a musical piece related to the first musical piece data,
receive a complementation instruction of the first musical piece data stored in the second storage,
when the complementation instruction is received, acquire second musical piece data corresponding to a musical piece related to the complementation instruction through a communication network, and
synthesize the first musical piece data stored in the second storage and the acquired second musical piece data to generate synthesized musical piece data; and
wherein the second storage is configured to store the synthesized musical piece data.

2. The audio device according to claim 1, further comprising:
a second broadcast processor configured to execute reception processing of a second broadcast wave having the same content as the first broadcast wave to generate a second reproduction signal; and
a selector configured to detect audio quality of each of the first reproduction signal and the second reproduction signal and select a signal having higher audio quality between the first reproduction signal and the second reproduction signal, wherein:
the reproduction unit is configured to reproduce audio based on the signal selected by the selector between the first reproduction signal and the second reproduction signal; and
the first storage is configured to temporarily store audio data related to the signal selected by the selector between the first reproduction signal and the second reproduction signal.

3. The audio device according to claim 2, wherein the first broadcast processor is one of an IP radio broadcast processor, a digital radio broadcast processor, and an analog radio broadcast processor,
wherein the second broadcast processor is another one of the IP radio broadcast processor, the digital radio broadcast processor, and the analog radio broadcast processor.

4. The audio device according to claim 3, wherein the IP radio broadcast processor is configured to receive an IP radio broadcast through an IP radio antenna,
wherein the IP radio broadcast is the first broadcast wave.

5. The audio device according to claim 3, wherein the digital radio broadcast processor is configured to receive a digital radio broadcast through a digital radio antenna,
wherein the digital radio broadcast is the first broadcast wave.

6. The audio device according to claim 3, wherein the analog radio broadcast processor is configured to receive an analog radio broadcast through an analog radio antenna,
wherein the analog radio broadcast is the first broadcast wave.

7. The audio device according to claim 1, wherein the controller is configured to control the display unit to display a reception screen that includes at least one of a classification of radio broadcast, information of a broadcast station, and a library selection button.

8. The audio device according to claim 7, wherein the controller is configured to control the display unit to display a selection screen when the library selection button is selected, the selection screen includes at least one of a recording time, a name of the musical piece, a reproduction button, and an update button.

9. The audio device according to claim 7, wherein the controller is configured to control the display unit to display a reproduction screen when the reproduction button is selected, the reproduction screen includes at least one of attribute information, a radio station name, a category name, the name of the musical piece, artist name, album title of the musical piece being reproduced.

10. The audio device according to claim 7, wherein the controller is configured to control the display unit to display an edition screen when the update button is selected, the edition screen includes the audio quality information of the selected musical piece.

11. The audio device according to claim 1, wherein the controller is configured to, when the time table is superimposed on the first broadcast wave, separate the superimposed time table from the first broadcast wave to acquire the time table, and when the time table is not superimposed on the first broadcast wave, acquire the time table through a communication network.

12. The audio device according to claim 1, wherein the controller is configured to replace first partial data in the first musical piece data having audio quality lower than the second musical piece data with second partial data in the second musical piece data corresponding to the first partial data to synthesize the first musical piece data and the second musical piece data.

13. The audio device according to claim 1, wherein the controller is configured to, when the complementation instruction is received, acquire moving image data corresponding to the musical piece related to the complementation instruction through the communication network and extract the second musical piece data from the acquired moving image data to acquire the second musical piece data.

14. The audio device according to claim 1, wherein the first broadcast processor is an IP radio broadcast processor that includes a data communication module and an IP radio decoder.

15. The audio device according to claim 1, wherein the first storage is a buffer memory and the second storage is an internal memory.

16. The audio device according to claim 1, wherein the first storage has a predetermined storage capacity.

17. The audio device according to claim 1, wherein the second storage is an external memory.

18. The audio device according to claim 1, wherein the controller includes a central processor unit.

19. The audio device according to claim 1, wherein the display unit is a liquid crystal display.

20. The audio device according to claim 1, wherein the audio processor is configured to generate an audio signal based on the first reproduction signal and the speaker is configured to generate audio based on the audio signal from the audio processor.

* * * * *